United States Patent [19]

Takahashi et al.

[11] Patent Number: 5,285,288
[45] Date of Patent: Feb. 8, 1994

[54] VIDEO SIGNAL REPRODUCING APPARATUS WITH TIME BASE CORRECTOR

[75] Inventors: Takao Takahashi; Hiroshi Okada, both of Tokyo, Japan

[73] Assignee: Sony Corporation, Tokyo, Japan

[21] Appl. No.: 570,431

[22] Filed: Aug. 21, 1990

[30] Foreign Application Priority Data

Aug. 25, 1989 [JP] Japan .................. 1-219815

[51] Int. Cl.$^5$ ............................................. H04N 9/89
[52] U.S. Cl. ................................. 358/320; 358/310; 358/339
[58] Field of Search .............. 358/320, 321, 322, 323, 358/324, 325, 326, 310, 337, 339; 360/36.1, 36.2; H04N 9/89, 5/95, 5/76, 9/79

[56] References Cited

U.S. PATENT DOCUMENTS

| | | | |
|---|---|---|---|
| 4,399,472 | 8/1983 | Yamamoto et al. | 358/320 |
| 4,480,273 | 10/1984 | Fujiki et al. | 358/341 |
| 4,485,395 | 11/1984 | Warren | 358/320 |
| 4,577,236 | 3/1986 | Takanashi | 358/337 |
| 4,608,609 | 8/1986 | Takano et al. | 358/320 |
| 4,714,965 | 12/1987 | Yoshinaka et al. | 358/320 |
| 4,737,861 | 4/1988 | Sekimoto | 358/320 |
| 4,775,899 | 10/1988 | Pastera et al. | 358/323 |
| 4,959,825 | 9/1990 | Okano | 358/337 |
| 4,980,779 | 12/1990 | Sakata | 358/320 |
| 5,075,781 | 12/1991 | Muramoto | 358/320 |

FOREIGN PATENT DOCUMENTS

| | | | |
|---|---|---|---|
| 62-3590 | 1/1987 | Japan | H04N 9/89 |
| 63-42297 | 2/1988 | Japan | H04N 9/89 |
| 63-59195 | 3/1988 | Japan | H04N 9/89 |
| 62-209391 | 8/1988 | Japan | H04N 9/89 |
| 63-312793 | 12/1988 | Japan | H04N 9/89 |

*Primary Examiner*—Tommy P. Chin
*Assistant Examiner*—Thai Tran
*Attorney, Agent, or Firm*—William S. Frommer; Alvin Sinderbrand

[57] ABSTRACT

In an apparatus for reproducing, from a record medium, a recorded video signal including an FM-modulated luminance signal and a chroma signal which is down-converted from an original frequency band; the FM-modulated luminance signal reproduced from the record medium is demodulated and than the time-base of the demodulated luminance signal is corrected, whereas, the time-base of the down-converted chroma signal reproduced from the record medium is corrected and then the reproduced chroma signal is up-converted to its original frequency band. A servo circuit, for example, for controlling the rotary drum motor and/or the capstan motor of a video tape recording/reproducing apparatus (VTR) during a reproducing operation, is controlled in response to a phase difference between write and read addresses applied to a memory of the time-base corrector so that such memory can be provided with a relatively small capacity.

11 Claims, 5 Drawing Sheets

FIG. 4A  Read Reset Signal

FIG. 4B  Window Pulse

FIG. 4C  Write Reset Signal

FIG. 6

VIDEO SIGNAL REPRODUCING APPARATUS WITH TIME BASE CORRECTOR

BACKGROUND OF THE INVENTION

1. Field of the Invention

This invention relates generally to video signal reproducing apparatus, such as, a video tape recorder (VTR) or the like, and more particularly is directed to a video signal reproducing apparatus which incorporates a time-base corrector.

2. Description of the Prior Art

When a video signal is reproduced by a video tape recorder or VTR, the reproduced signal is often supplied to a time-base corrector (TBC) in which a time-base of the reproduced signal is corrected for removing a jitter component therefrom.

Figure 1:
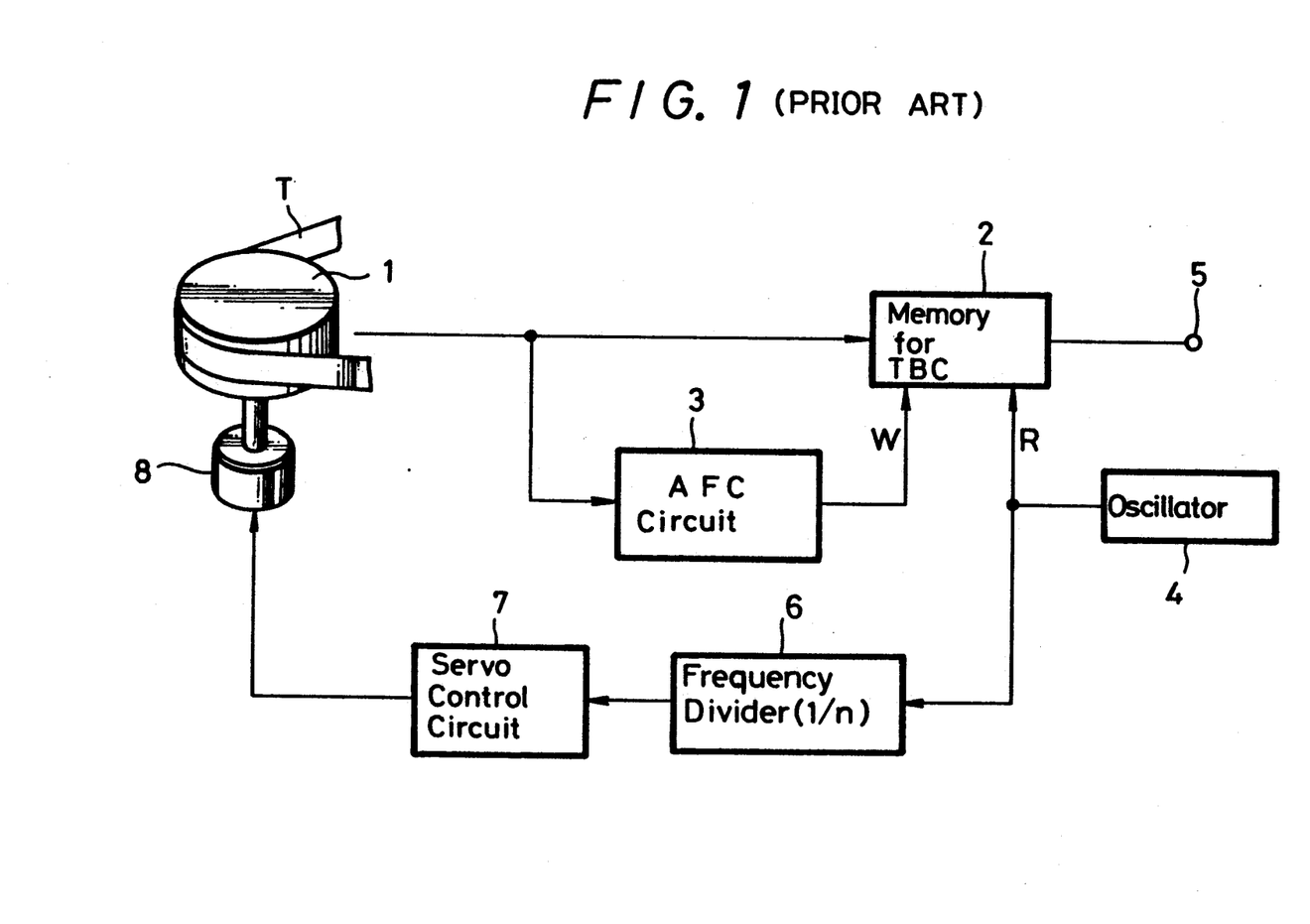
FIG. 1 is a schematic diagram illustrating a video signal reproducing circuit according to the prior art which incorporates a time-base corrector.

A video signal reproducing circuit which incorporates a time-base corrector according to the prior art is shown schematically on FIG. 1 to include a rotary head drum assembly 1 around which a magnetic recording tape T is helically wrapped so that a magnetic head (not shown) provided in the drum assembly 1 will reproduce a video signal recorded in slant tracks on the tape T. The video signal reproduced from the magnetic tape T is shown to be supplied to a memory 2 which is included in a time-base corrector (TBC). The reproduced video signal is also supplied to an automatic frequency control (AFC) circuit 3 which generates a write clock signal W synchronized with the reproduced video signal which is written in the memory 2 in accordance with the write clock signal W. A standard or reference oscillation signal is supplied from an oscillator 4 to the time-base corrector memory 2 as a read clock signal R. Therefore, time-base fluctuations that may appear in the reproduced video signal due to a jitter component therein are removed from the video signal as the latter is read from the memory 2 in accordance with the standard read clock signal R. The resulting stable read-out video signal is supplied to an output terminal 5. The read clock signal R from the oscillator 4 is also supplied to a frequency divider 6 in which it is frequency-divided by a divisor n, whereupon the resulting frequency-divided signal is supplied to a servo control circuit 7 as a control signal therefor. The servo control circuit 7 effects servo control of a motor 8 for driving the rotary head drum assembly 1, and may also effect servo control of a capstan motor (not shown) by which the tape T is longitudinally advanced about the drum assembly 1.

When the video signal reproducing circuit is arranged as described above with reference to FIG. 1, the rotary head drum assembly 1 and the capstan for driving the tape are controlled on the basis of the read clock signal R for the memory 2 of the time-base corrector, and the writing cycle and the reading cycle of the memory 2 are approximately equal to each other. Therefore, it is possible to avoid or inhibit overtaking of the writing of the video signal in the memory 2 by the reading of the video signal from the memory, with the result that a stable time-base correction can be performed.

In the described video signal reproducing circuit according to the prior art, the reproduced video signal is written in the memory 2 as a composite video signal. In that case, the luminance and chrominance signals constituting the composite video signal must be kept in a stable interleaved relationship and, therefore, the described arrangement is, for the most part, utilized only in professional video tape recorders. However, the video signal reproducing circuit described with reference to FIG. 1 cannot be applied to a consumer or home video tape recorder of the type in which the chroma signal is down-converted in the recorded signal.

In the case of a video tape recorder of the down-converted chroma signal type, a chroma signal extracted from the reproduced video signal is demodulated to provide a base band signal which is then applied to a time-base corrector. However, in order to avoid deterioration of the chroma signal, it is desirable that the chroma signal be supplied directly to the time-base corrector without being first subjected to processing, such as, the described demodulation or the like.

On the other hand, if a reproduced video signal is supplied directly to a time-base corrector in the form of a high frequency signal reproduced from the magnetic tape so as to avoid deterioration of the reproduced signal by an intervening demodulation or other signal processing, the side band of the luminance signal included in the reproduced high frequency signal is expanded to a high band so that the operating frequency of the memory in the time-base corrector must be considerably increased, with a resulting increase in the scale of the circuit. Such a large scale circuit is difficult to provide in actual practice.

When the reproducing servo circuit 7 is controlled on the basis of the read clock signal R for the memory 2 of the time-base corrector, as in the prior art circuit shown in FIG. 1, if such memory 2 has a large storage capacity, for example, is a field memory so as to be capable of storing one field period of the reproduced video signal, the storage capacity of the memory is sufficient for ensuring that the read cycle of the video signal can be prevented from overtaking the writing cycle of the video signal in the memory 2. However, it is desirable to reduce the storage capacity of the memory 2 and thereby permit the scale of the video signal reproducing circuit to be correspondingly reduced.

OBJECTS AND SUMMARY OF THE INVENTION

Accordingly, it is an object of the present invention to provide a video signal reproducing apparatus which can avoid the above mentioned problems and disadvantages associated with the prior art.

More specifically, it is an object of the present invention to provide a video signal reproducing apparatus in which a reproducing servo circuit is controlled in response to a phase difference between writing and reading addresses of a memory included in a time-base corrector.

It is another object of the present invention to provide a video signal reproducing apparatus, as aforesaid, in which the storage capacity of the memory included in the time-base corrector can be considerably reduced.

It is still another object of the present invention to provide a video signal reproducing apparatus, as aforesaid, in which a time-base corrector can be provided with a relatively simplified circuit arrangement.

It is a further object of the present invention to provide a video signal reproducing apparatus, as aforesaid, in which satisfactory signal processing of the reproduced video signal can be effectively carried out.

In accordance with an aspect of the present invention, in an apparatus for reproducing, from a record medium, a video signal recorded in the latter and including an FM-modulated luminance signal and a chroma signal down-converted from an original frequency band; the FM-modulated luminance signal reproduced from the record medium is demodulated and then the time-base of the demodulated luminance signal is corrected, whereas, the time-base of the down-converted chroma signal reproduced from the record medium is corrected and then the reproduced chroma signal is up-converted to its original frequency band.

In accordance with another aspect of the present invention, in an apparatus for reproducing, from a record medium, a video signal recorded in the latter and including an FM-modulated luminance signal, a chroma signal down-converted from an original frequency band and an FM-modulated audio signal; the FM-modulated luminance signal reproduced from the record medium is demodulated and then the time-base of the demodulated luminance signal is corrected, whereas, the time bases of the down-converted chroma signal and the FM-modulated audio signal reproduced from the record medium are corrected and then the time-base corrected chroma signal is up-converted to its original frequency band.

In accordance with still another aspect of the present invention, in a video signal reproducing apparatus, as aforesaid, a reproducing servo circuit, for example, for controlling the motor driving a rotary head drum assembly and/or the capstan motor of a VTR during a reproducing operation, is controlled in response to a phase difference between writing and reading addresses applied to a memory of the time-base corrector so that such memory can be provided with a relatively small capacity.

The above, and other objects, features and advantages of the present invention, will be apparent in the following detailed description of preferred embodiments when read in conjunction with the accompanying drawings in which corresponding components are identified by the same reference numerals in the several views of the drawings.

DETAILED DESCRIPTION OF THE PREFERRED EMBODIMENTS

A video signal reproducing circuit according to a first embodiment of the present invention will now be described in detail with reference to FIGS. 2–3. In such embodiment, the invention is applied to a video tape recorder (VTR) of the down-converted type in which a luminance signal is FM-modulated and a chroma signal is down-converted prior to being recorded on a magnetic tape. Further, an audio signal may be FM-modulated so as to be frequency-multiplexed with the video signal and recorded on the magnetic tape with the video signal.

Figure 2:
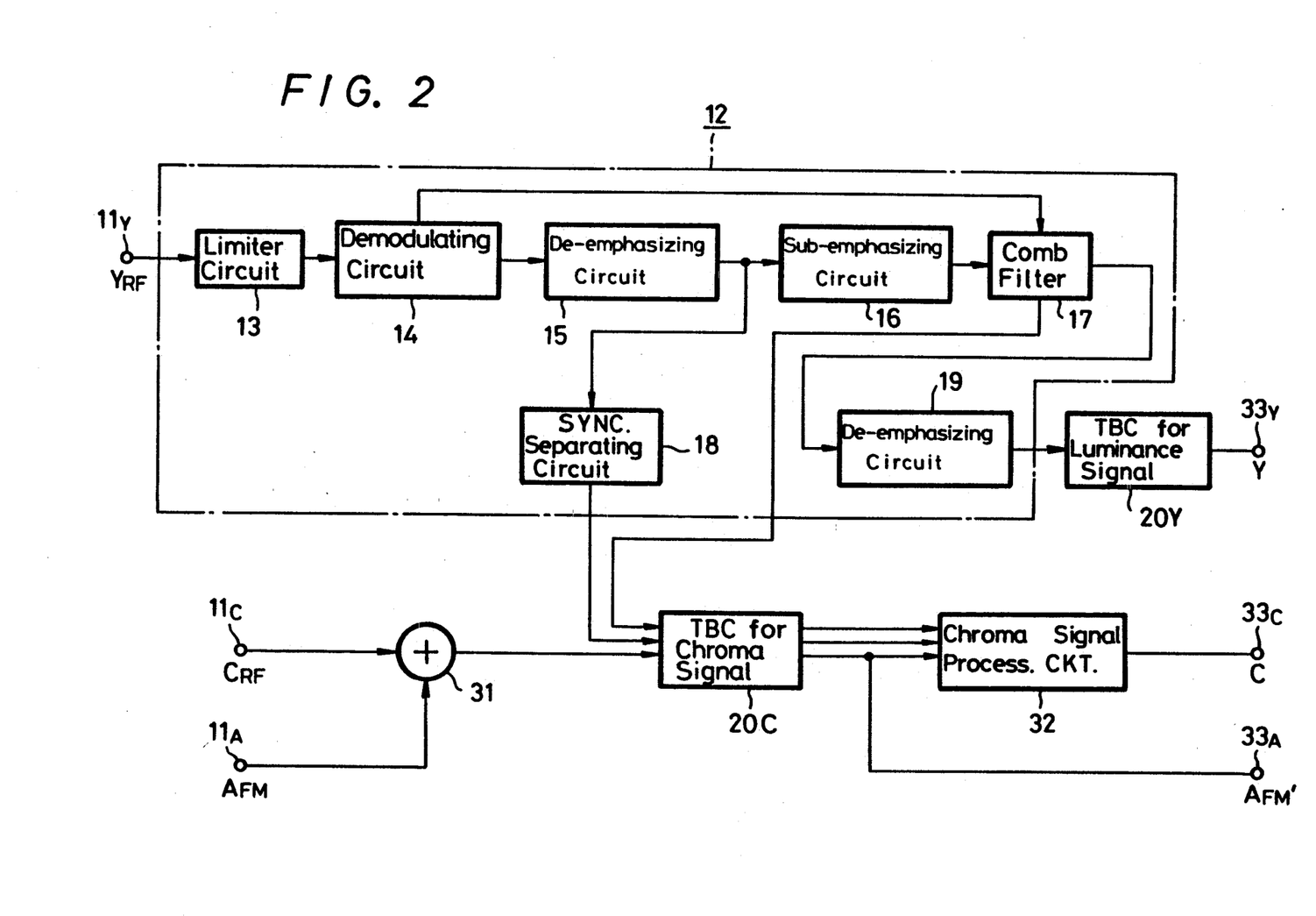
FIG. 2 is a schematic block diagram showing a video signal reproducing circuit according to a first embodiment of the present invention.

When the recorded video and audio signals are reproduced from the magnetic tape, the reproduced frequency-modulated luminance signal $Y_{RF}$ and down-converted chrominance signal $C_{RF}$ are respectively applied to input terminals 11Y and 11C (FIG. 2). Further, the reproduced FM-modulated audio signal $A_{FM}$ is supplied to a respective input terminal 11A.

The reproduced frequency-modulated luminance signal $Y_{RF}$ is applied from the input terminal 11Y to a luminance signal processing circuit 12 in which the signal $Y_{RF}$ passes through a limiter circuit 13 to an FM-demodulating circuit 14. The resulting FM-demodulated luminance signal is supplied to a deemphasizing circuit 15 and is there suitably deemphasized. In the FM-demodulating circuit 14 a drop-out in the high frequency level of the reproduced video signal is detected and gives rise to a detection signal which is supplied to a comb filter 17. The deemphasized luminance signal from the circuit 15 is supplied through a sub-emphasizing circuit 16 to the comb filter 17. In the comb filter 17, a drop-out is compensated on the basis of the drop-out detection signal from the demodulating circuit 14, and a vertical correlation of the reproduced video signal is detected. A vertical correlation detection signal is supplied from the comb filter circuit 17 through a chroma signal time base corrector 20C to a chroma signal processing circuit 32. The deemphasized luminance signal from the circuit 15 is also supplied to a synchronizing signal separating circuit 18 which detects an interval in which a burst signal is supplied and provides a corresponding burst flag signal through the chroma signal time-base corrector 20C to the chroma signal processing circuit 32. The luminance signal output from the comb filter 17 is supplied through a deemphasizing circuit 19 to a luminance signal time-base corrector 20Y which, as hereinafter described, is desirably integrated with the chroma signal time-base corrector 20C. In the embodiment of the invention being presently described, the luminance signal time-base corrector 20Y is a digital time-base corrector utilizing a memory. More specifically, in the luminance signal time-base corrector 20Y, a signal supplied thereto is converted from analog to digital form, and the resulting digital signal is then written in a memory. The digital signal written or temporarily stored in the memory is read therefrom on the basis of a stable read clock, and is then reconverted from digital to analog form so as to provide a base band luminance signal Y having a corrected time-base and which is delivered from the time-base corrector 20Y through a luminance signal output terminal 33Y.

The down-converted chroma signal $C_{RF}$ applied to the chroma signal terminal 11C and the FM-modulated audio signal $A_{FM}$ applied to the audio signal input terminal 11A are supplied to a mixer 31, and the resulting mixed signal is supplied from the mixer 31 to the chroma signal time-base corrector 20C. A mixed signal having a corrected time-base is supplied from the chroma signal time-base corrector 20C to the chroma signal processing circuit 32 which derives therefrom a chroma signal C up-converted to its original frequency band by suitable processing thereof, for example, by demodulation or the like, of the down-converted chroma signal. Such chroma signal C is supplied to a chroma signal output terminal 33C. In the embodiment of the invention shown in FIG. 2, the chroma signal processing circuit 32 performs the required processing of the reproduced chroma signal on the basis of the vertical correlation detection signal and the burst flag signal supplied thereto through the time-base corrector 20C from the luminance signal processing circuit 12.

An FM-modulated audio signal $A_{FM}$ having a corrected time-base is supplied from the chroma signal time-base corrector 20C through an output terminal 33A to a suitable audio signal processing circuit (not shown).

A time-base corrector 20, which incorporates both the luminance signal time-base corrector 20Y and the chroma signal time-base corrector 20C of FIG. 2 and a control circuit therefor, will now be described further with reference to FIG. 3 in which the base band luminance signal applied from the deemphasizing circuit 19 on FIG. 2 to a terminal 21Y and the down-converted chroma signal applied from the mixer 31 to a terminal 21C are both shown to be supplied to respective inputs of the time-base corrector 20. In the example being presently described, a memory provided within the time-base corrector 20 of FIG. 3 has a storage capacity sufficient to store therein the luminance signal and the chroma signal of 5 horizontal scanning periods (5H). The luminance and chrominance signals are written in the time-base corrector memory on the basis of a write clock signal W supplied thereto from an automatic frequency control (AFC) circuit (not shown) through a terminal 20a. The write clock signal W is also supplied from the terminal 20a to a first 5H counter 23 which generates a write reset signal WR whenever the counter 23 counts a number of the write clock signals W equivalent to 5 horizontal scanning periods (5H). Such write reset signal WR is supplied from the counter 23 to the time-base corrector 20.

A read clock signal R from an oscillator 24 is supplied to the time-base corrector 20, and the luminance signal and chroma signal written in the memory of the time-base corrector 20 are read therefrom on the basis of the read clock signal R and are respectively fed through a luminance signal output terminal 22Y and a chroma signal output terminal 22C for transmission to later stages of the circuit. The read clock signal R is also supplied from the oscillator 24 to a second 5H counter 25 which generates a read reset signal RR whenever the counter 25 counts a number of the read clock signals R equivalent to 5 horizontal scanning periods (5H), and such read reset signal RR is supplied to the time-base corrector 20.

The read reset signal RR from the second 5H counter 25 is also shown to be supplied to a window pulse generating circuit 26 which, in response to the read reset signal RR, generates a window pulse signal WP supplied to one input terminal of an AND gate 27. In the example being described, the window pulse signal WP alternates between high and low level portions each having a duration of 2.5 H. The write reset signal WR from the first 5 H counter 23 is shown to be supplied to the other input terminal of the AND gate 27, and the output of the AND gate 27 is supplied to a 1/n counter 28 for controlling the count start value n of the latter. The 1/n counter 28 is also shown to be supplied with the read clock signal R from the oscillator 24, and the count output of the counter 28 is supplied through an output terminal 20b as a control signal for a reproducing servo circuit (not shown) which, as in the prior art circuit of FIG. 1, may control the motor driving the rotary head drum assembly and/or the capstan motor.

Operation of the control circuit for the time-base corrector 20 of FIG. 3 will now be described with reference to FIGS. 4A-4C. On the basis of the read clock signal R, the second 5 H counter 25 generates the read reset signal RR as a pulse which rises at every 5 H periods, as shown in FIG. 4A. In response to such read reset signal RR, the window pulse generating circuit 26 generates the window pulse signal WP with a waveform shown in FIG. 4B. More particularly, the window pulse signal WP has a high level for an interval of 2.5 H periods which, as shown on FIGS. 4A and 4B, is substantially intermediate the leading edges of successive read reset pulses RR. The output of the AND circuit 27, which receives the window pulse signal WP (FIG. 4B) and the write reset signal WR (FIG. 4C), is supplied to the 1/n counter 28. If the write reset pulse WR rises up during the period in which the window pulse signal WP is at a high level, as in FIGS. 4B and 4C, the output of the AND circuit 27 is at a high level during the existence of the write reset pulse or signal WR, that is, the write reset signal WR (FIG. 4C) is, in effect, supplied to the 1/n counter 28. However, if the write reset pulse or signal WR rises up during a period in which the window pulse signal WP is at a low level, that is, if there is no coincidence between the high level portions of the write reset signal or pulse WR and the window pulse signal WP, the output of the AND gate 27 remains at a low level so that the write reset signal or pulse WR is not supplied through the AND gate 27 to the 1/n counter 28.

It will be appreciated that, whenever the write reset pulse WR is supplied through the AND gate 27 to the 1/n counter 28, that is, whenever the write reset pulse or signal WR occurs during the period when the window pulse signal WP is at a high level, there is a substantially large phase difference between the write reset signal WR and the read reset signal RR. However, if the phase difference between the write reset signal WR and the read reset signal RR becomes smaller than 1.25 H, the write reset pulse or signal WR is no longer supplied through the AND gate 27 to the 1/n counter 28 as an n-value control signal for the latter. If the phase difference between the write reset signal WR and the read reset signal RR continues to decrease, there is a substantial risk that the reading of the stored video signal from the memory of the time-base corrector will overtake or pass the writing of the video signal in such memory. In order to avoid the possibility of the reading cycle overtaking the writing cycle, the count start value of the 1/n counter 28 is suitably changed in response to the output of the AND gate 27 so that the control signal supplied from the counter 28 to the reproducing servo circuit will vary the rotation of the rotary head drum assembly and/or of the capstan in the sense to maintain the generation time of the write reset pulse WR during the period in which the window pulse signal WP is at high level. In other words, the count start value of the 1/n counter 28 is varied so that the phase difference between the write reset signal WR and the read reset signal RR is maintained at or near the maximum.

By reason of the above described control circuit for the time-base corrector 20, even when the memory of the time-base corrector has a relatively small storage capacity, for example, a capacity for storing the luminance and chrominance signals of 5H periods, overtaking of the writing of the signal in the memory by the reading of the signal from the memory can be avoided, with the result that satisfactory time-base correction can be carried out without requiring a large capacity memory therefor.

Operation of a video tape recorder having the video signal reproducing circuit of FIG. 2 provided with the time-base corrector of FIG. 3 will now be described with reference to FIGS. 5A-5F. For the purposes of this description, it will be assumed that the luminance signal $Y_{RF}$ applied to the terminal 11Y after being reproduced from the magnetic tape provides the luminance signal typically shown in FIG. 5A after being FM-demodulated by the circuit 14 in the luminance signal processing circuit 12. It will be further assumed that the chroma signal $C_{RF}$ applied to the terminal 11C after being reproduced from the magnetic tape is as typically shown in FIG. 5B, and thus contains a burst signal b. The synchronizing separating circuit 18 in the luminance signal processing circuit 12 generates a burst flag signal (FIG. 5C) whose phase or timing coincides with the timing of the burst signal b in the reproduced chroma signal $C_{RF}$ (FIG. 5B).

Figures 5A, 5B:
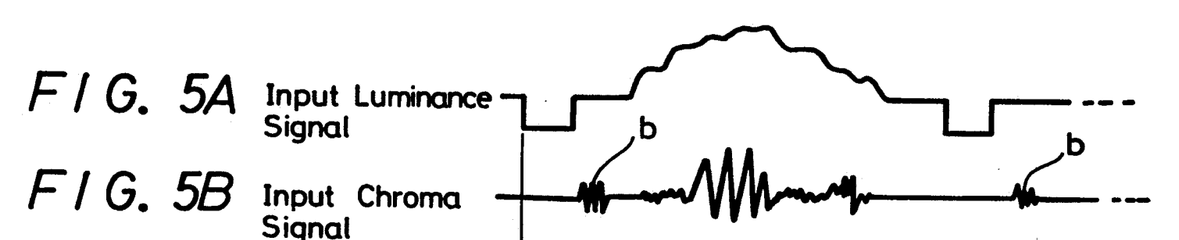
Figure 5C:
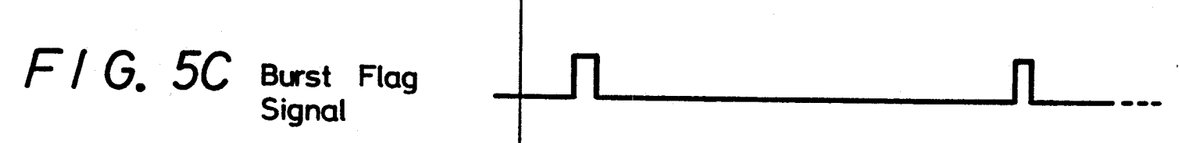
Figure 5D:
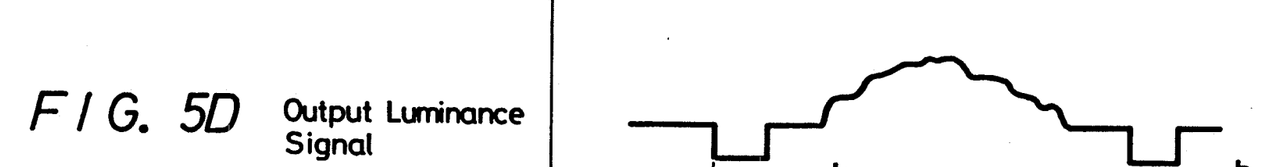
Figure 5E:
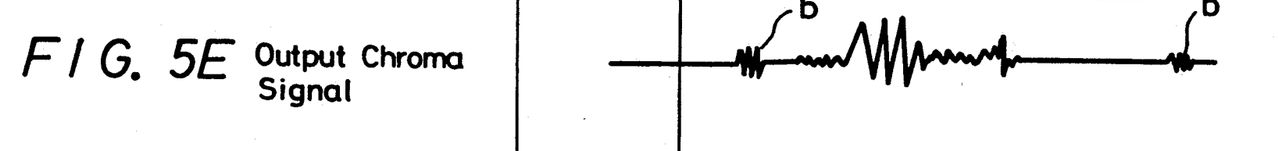

When the luminance signal shown in FIG. 5A is ultimately supplied to the time-base corrector 20Y, a time-base corrected luminance signal Y (FIG. 5D) is fed from the latter to the output terminal 33Y. Between the writing of the luminance signal in the memory of the time-base corrector Y and the subsequent reading out of the luminance signal therefrom, there is an inherent time difference or delay t between the luminance signal (FIG. 5A) at the input to the time-base corrector 20A and the corresponding luminance signal (FIG. 5D) at the output thereof. In FIGS. 5A-5F, the time t is shown to be shorter than it is in actual practice for the sake of convenience in illustration and explanation. The chroma signal (FIG. 5E) output from the time-base corrector 20C is similarly delayed by the time t relative to the input chroma signal (FIG. 5B). The output chroma signal from the time-base corrector 20C is still a down-converted chroma signal so that the time-base corrected chroma signal must be frequency-converted or up-converted to its original frequency band by the chroma signal processing circuit 32. Since the reproduced luminance signal is demodulated, as in the circuit 14, before being supplied to the time-base corrector 20Y and the burst flag signal is generated by the synchronizing separating circuit 18 and the vertical correlation detection signal is provided by the comb filter 17 in the luminance signal processing circuit 12 in advance of the time-base corrector 20Y, such burst flag signal and vertical correlation detection signal are coincident, in timing, with the reproduced luminance and chroma signals shown in FIGS. 5A and 5B, respectively. If the burst flag signal shown in FIG. 5C and the corresponding vertical correlation detection signal were directly supplied to the chroma signal processing circuit 32, that is, if the burst flag signal and the vertical correlation detection signal were not passed through the time-base corrector 20C en route to the chroma signal processing circuit 32, as shown on FIG. 2, the signal processing effected in the circuit 32 in response to the burst flag signal and the vertical correlation detection signal would occur too soon by the time t.

Figure 5F:
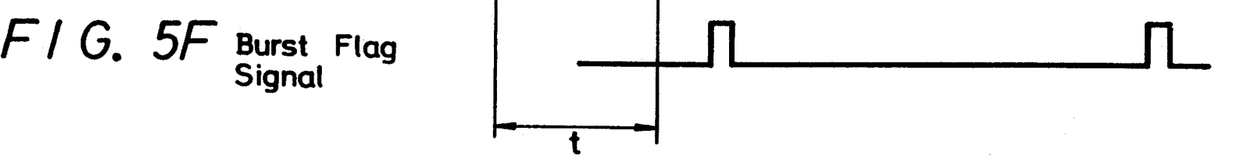

However, in the embodiment of the present invention shown in FIG. 2, the burst flag signal from the synchronizing separating circuit 18 and the vertical correlation detection signal from the comb filter 17 are supplied to the chroma signal processing circuit 32 through the time-base corrector 20C so that they are time-base corrected and thereby delayed to the same extent as the chroma signal and luminance signal supplied through the time-base correctors 20C and 20Y, respectively. Therefore, the chroma signal (FIG. 5E), the burst flag signal (FIG. 5F) and the vertical correlation detection signal (not shown) are coincident in timing as supplied to the chroma signal processing circuit 32. Thus, the processing of the chroma signal in the circuit 32 can be effected with proper timing on the basis of the burst flag signal and the vertical correlation detection signal. In the case where the burst flag signal and the vertical correlation detection signal are each one-bit signals of either high level or low level, the time-base corrector 20C need only have an extra storage capacity of two bits so as to permit the burst flag signal and the vertical correlation detection signal to be time-base corrected.

It will be appreciated that, in the video signal reproducing circuit according to the above described embodiment of this invention, the luminance signal and the chroma signal extracted from the video signal reproduced from the magnetic tape are time-base corrected by the correctors 20Y and 20C, respectively, for removing any jitter component and thereby making it possible to obtain a satisfactory reproduced signal. In the embodiment of FIG. 2, since the luminance signal, which contains a major portion of the recorded information, is FM-demodulated before being fed to the time-base corrector 20Y, such time-base corrector 20Y does not need to process a signal extended to a high band, as would be the case if the reproduced high frequency FM-modulated luminance signal was supplied, in that form, to the time-base corrector 20Y. Accordingly, the load on the memory of the time-base corrector 20Y is relatively reduced. Further, in the case of the chroma signal which contains a relatively small amount of information, the down-converted reproduced signal is time-base corrected by the corrector 20C before the chroma signal is frequency-converted or up-converted to its original frequency band. In other words, the time-base correction of the chroma signal is carried out under conditions in which the deterioration of the chroma signal is minimized. Furthermore, since the amount of information in the chroma signal is small as compared with the amount of information in the luminance signal, the fact that the down-converted reproduced chroma signal is time-base corrected prior to being frequency-converted does not excessively increase the load on the time-base corrector memory. Therefore, the video signal reproducing circuit according to the embodiment of the invention illustrated in FIG. 2 can satisfactorily carry out the necessary signal processing with relatively little signal deterioration and by means of a simplified time-base corrector including a memory of relatively small storage capacity.

Figure 3:
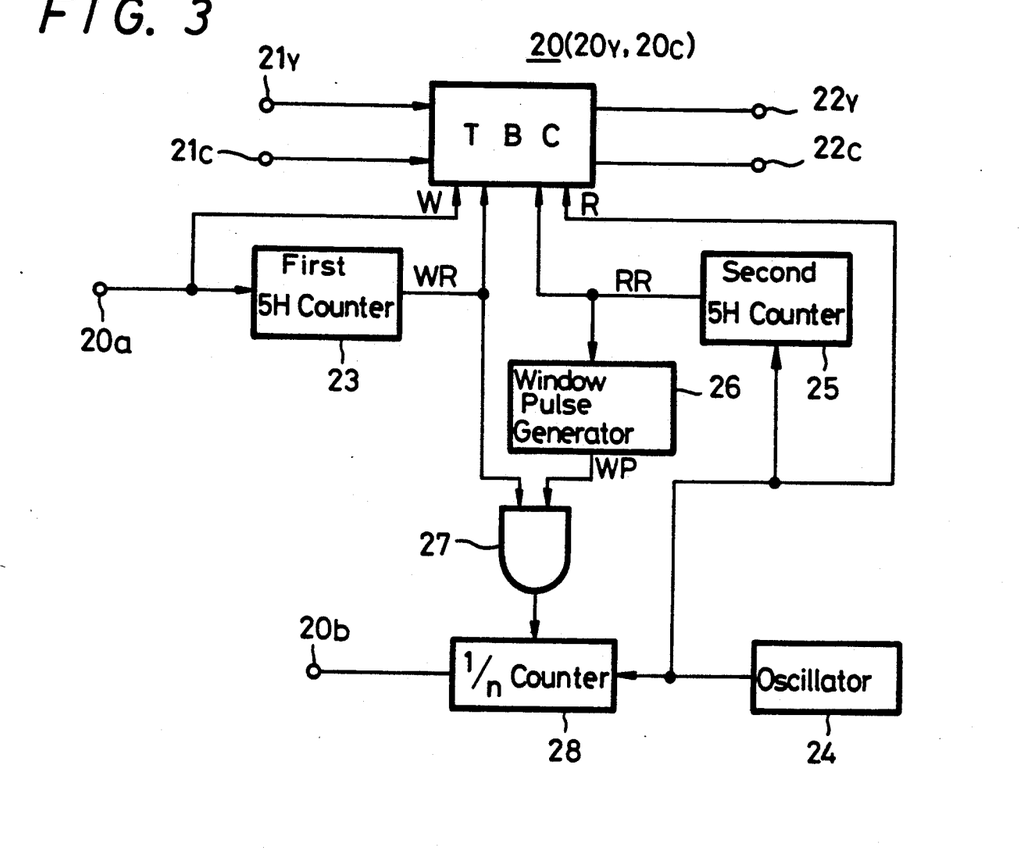
FIG. 3 is a schematic block diagram showing, in greater detail, a control circuit for controlling a time-base corrector included in the embodiment of the present invention shown in FIG. 2.
Figure 4A:
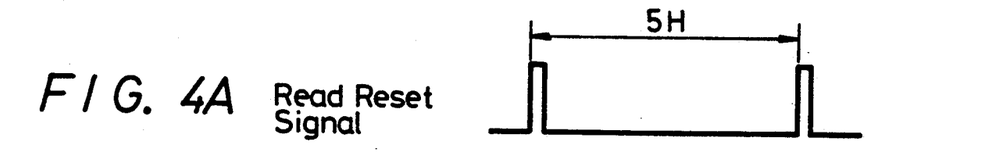
FIGS. 4A–4C and FIGS. 5A–5F are timing charts to which reference will be made in explaining the operation of the video signal reproducing circuit shown in FIG. 2.
Figures 4B, 4C:
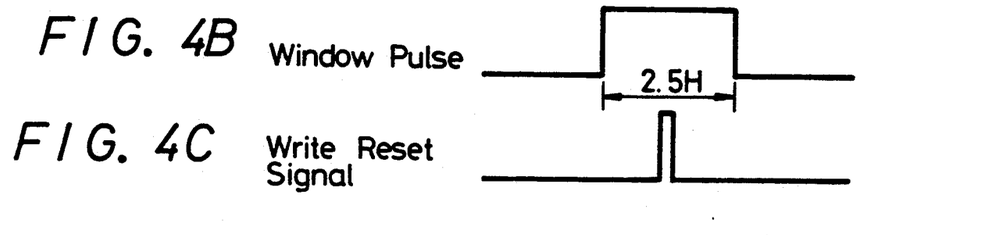

Since the controlling of the writing and reading in the memory of the time-base corrector 20 comprised of the correctors 20Y and 20C is carried out in association with the reproducing servo circuit, as described above with reference to the control circuit of FIG. 3, it is sufficient if the time-base corrector has a memory with a storage capacity of merely several horizontal lines, as distinguished from the relatively massive storage capacity employed in field memories or the like required in the prior art. Therefore, the storage capacity of the memory can be very substantially reduced to simplify and reduce the cost of the time-base corrector.

Furthermore, in the embodiment of the invention described with reference to FIG. 2, the reproduced FM-modulated audio signal is mixed with the reproduced chroma signal and is then time-base corrected in the same time-base corrector 20C so that any time-base fluctuations in the reproduced audio signal are removed therefrom to provide an excellent output audio signal with little if any wow and flutter components. It is also to be noted that such improvement in the quality of the output audio signal is achieved without providing a separate or additional time-base corrector for the audio signal.

Figure 6:
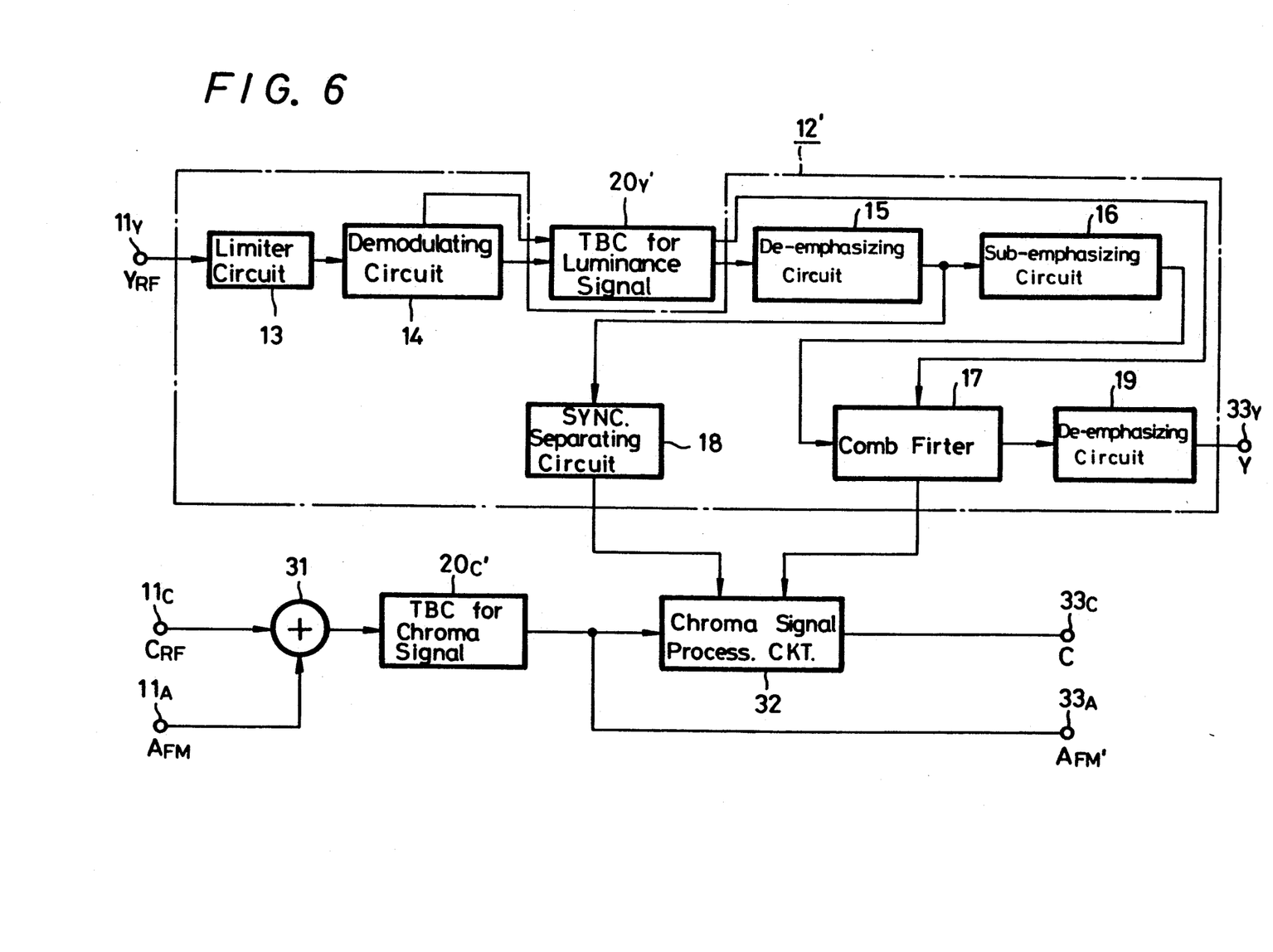
FIG. 6 is a schematic block diagram showing a video signal reproducing circuit according to a second embodiment of the present invention.

Although it is the output luminance signal from the luminance signal processing circuit 12 which is time-base corrected by the time-base corrector 20Y immediately before the application of the luminance signal to the output terminal 33Y in the embodiment of FIG. 2, the luminance signal may be time-base corrected at any other locations in the circuit after the luminance signal has been FM-demodulated. For example, as shown in FIG. 6, in a video signal reproducing circuit according to another embodiment of this invention, the output of the FM-demodulating circuit 14 in the luminance signal processing circuit 12' is supplied directly to a luminance signal time-base corrector 20Y', and the time-base corrected luminance signal from the corrector 20Y' is supplied to the deemphasizing circuit 15 in the luminance signal processing circuit 12'. Further, in the embodiment of FIG. 6, the drop-out detecting signal provided in the demodulating circuit 14 is supplied through the time base corrector 20Y' to the comb filter 17 for ensuring that the timing of the drop-out compensation in the comb filter 17 will be correct. Moreover, in the embodiment of FIG. 6, the burst flag signal from the synchronizing separating circuit 18 in the luminance signal processing circuit 12' and the vertical correlation detection signal from the comb filter 17 also in the processing circuit 12', are supplied directly to the chroma signal processing circuit 32, that is, do not need to be passed through the chroma signal time-base corrector 20C'. The foregoing results from the fact that, in the embodiment of FIG. 6, the burst flag signal and the vertical correlation detection signal are derived from the time-base corrected luminance signal, and hence are subjected to the same delay as the chroma signal in passing through the time base corrector 20C'. As in the embodiment of FIG. 2, the time-base correctors 20Y' and 20C' may be incorporated in a single unit which is controlled as described above with reference to FIG. 3.

It will be apparent that, apart from the distinctions specifically described above, the video signal reproducing circuit of FIG. 6 operates substantially in the same manner as the circuit described with reference to FIG. 2, and is endowed with substantially the same functional advantages.

Although preferred embodiments of the invention have been specifically described herein with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. In an apparatus for processing a video signal reproduced from a record medium and including a reproduced FM-modulated luminance signal and a reproduced down-converted chroma signal down-converted from an original frequency band, the combination of:
   means for demodulating said reproduced FM-modulated luminance signal;
   correcting means for correcting time-bases of the demodulated luminance signal and said reproduced down-converted chroma signal, said correcting means including a memory having a predetermined capacity of substantially less than one field and into which the demodulated luminance signal and the down-converted chroma signal are written at a rate influenced by time-base errors in the reproduced video signal and from which time-base corrected luminance and chroma signals are read at a constant rate;
   means for generating a first signal when the amount written into said memory reaches said predetermined capacity;
   means for generating a second signal when the amount read from said memory reaches said predetermined capacity;
   means for generating a phase difference signal when a phase difference between said first and said second signals exceeds a predetermined amount;
   reproducing servo means responsive to said phase difference signal for changing the rate of writing into said memory; and
   means for up-converting the time-base corrected chroma signal to said original frequency band.

2. The apparatus according to claim 1; in which said means for up-converting the time-base corrected chroma signal to said original frequency band includes chroma signal processing means operating on the basis of control signals derived from the demodulated luminance signal, and means for synchronizing said control signals, as applied to said chroma signal processing means, with said time-base corrected chroma signal.

3. The apparatus according to claim 2; in which said means for synchronizing said control signals includes means for generating said control signals from said demodulated luminance signal in advance of the time-base correcting of the demodulated luminance signal, and means for passing said control signals to said chroma signal processing means through said means for correcting the time base of said down-converted chroma signal; and in which said means for time base correcting said demodulated luminance signal and said down-converted chroma signal impose similar delays on the signals passed therethrough.

4. The apparatus according to claim 2; in which said means for synchronizing said control signals includes means for generating said control signals from the time-base corrected demodulated luminance signal, and means for passing said control signals directly from said means for generating to said chroma signal processing means; and in which said means for time-base correcting said demodulated luminance signal and said down-converted chroma signal impose similar delays on the signals passed therethrough.

5. The apparatus according to claim 2; in which said control signals include a burst flag signal and a vertical correlation detection signal.

6. The apparatus according to claim 2; further comprising synchronizing signal separating means for deriving a burst flag signal from said demodulated luminance signal which constitutes one of said control signals.

7. The apparatus according to claim 6; in which said synchronizing signal separating means receives said demodulated luminance signal in advance of the time base correcting thereof, said burst flag signal is supplied to said chroma signal processing means through said means for time-base correcting the down-converted chroma signal, and said means for time-base correcting said demodulated luminance signal and said down-converted chroma signal, respectively, impose similar delays on the signals passed therethrough.

8. The apparatus according to claim 6, in which said synchronizing signal separating means receives said demodulated luminance signal after the time-base correcting of the latter, said burst flag signal is supplied to said chroma signal processing means directly from said synchronizing signal separating means, and said means for time-base correcting said demodulated luminance signal and said down-converted chroma signal, respectively, impose similar delays on the signals passed therethrough.

9. The apparatus according to claim 1, wherein said means for generating a phase difference signal includes means for maximizing said phase difference between said first and said second signals.

10. In an apparatus for processing a video signal reproduced from a record medium and including a reproduced FM-modulated luminance signal, a reproduced down-converted chroma signal down-converted from an original frequency band and a reproduced FM-modulated audio signal, the combination of:
  means for demodulating said reproduced FM-modulated luminance signal;
  correcting means for correcting time bases of the demodulated luminance signal, said reproduced down-converted chroma signal and said reproduced FM-modulated audio signal, said correcting means including a memory having a predetermined capacity of substantially less than one field and into which the demodulated luminance signal, the down-converted chroma signal and the reproduced FM-modulated audio signal are written at a rate influenced by time-base errors in the reproduced video signal and from which time-base corrected luminance, chroma and audio signals are read at a constant rate;
  means for generating a first signal when the amount written into said memory reaches said predetermined capacity;
  means for generating a second signal when the amount read from said memory reaches said predetermined capacity;
  means for generating a phase difference signal when a phase difference between said first and said second signals exceeds a predetermined amount;
  reproducing servo means responsive to said phase difference signal for changing the rate of writing into said memory; and
  means for up-converting the time base corrected chroma signal to said original frequency band.

11. In an apparatus for processing a reproduced video signal reproduced from a record medium, the combination of:
  time base correcting means for correcting time base errors in the reproduced video signal and which includes a memory having addresses at which the reproduced video signal is written at a rate influenced by said time base errors and from which the video signal is read at a desired constant rate so as to have its time base corrected;
  reproducing servo means controllable by a control signal for reducing said time base errors in the reproduced video signal; and
  control means including counter means for counting from a controllable count start value to produce said control signal, and means for controlling said controllable count start value in response to a phase difference between the addresses in said memory at which said reproduced video signal is written and from which the time base corrected video signal is read, respectively.

* * * * *